Oct. 6, 1959 L. W. CALI 2,907,524
CONDITIONAL STOP CONTROL APPARATUS
Filed June 1, 1954 2 Sheets-Sheet 1

INVENTOR.
LLOYD W. CALI
BY
James B. Christie
ATTORNEY

CONDITIONAL STOP CONTROL APPARATUS

Filed June 1, 1954 2 Sheets-Sheet 2

INVENTOR.
LLOYD W. CALI
BY
James B. Christie
ATTORNEY 2,907,524
Patented Oct. 6, 1959

2,907,524

CONDITIONAL STOP CONTROL APPARATUS

Lloyd W. Cali, West Covina, Calif., assignor, by mesne assignments, to Burroughs Corporation, Detroit, Mich., a corporation of Michigan Application June 1, 1954, Serial No. 433,694
7 Claims. (Cl. 235—151)

This invention relates to control arrangements for selectively halting the operation of code-controlled apparatus such as electronic digital computers, so that the coding may be checked at selected times during the operation of the apparatus.

In high speed digital computers, an internally-stored program is ordinarily employed to control the operations to be performed by the computer. Signal information representing numbers in code form is fed into the computer where it is stored in an internal memory. In a like manner, signal information arranged in the form of multi-digit commands indicating the operations to be performed are introduced into the computer and stored in the memory. In one form of digital computer, the command comprises an order portion and an operand address portion. The order portion of the command indicates the arithmetic operation which is to be performed, and the operand address portion of the command indicates the address in the internal memory of the numerical information upon which the arithmetic operation is to be performed.

The arithmetic computations are usually performed by a series of additions or subtractions which are effected at a high speed in accordance with the respective commands. Frequently it is desirable to halt the operation of the computer at selected points throughout the program so that the operator can check the coding in various parts of the computer for errors. This may be done by storing stop orders in the order portions of special commands at suitable locations throughout the command list. Such an arrangement has the disadvantage that the operator who arranges the program to be carried out by the computer must determine the points at which he believes such stops will be necessary before the program is prepared and before the program is stored in the computer. Also, such stop orders must be positioned at fixed locations throughout the program so that small portions of the program between two stop orders cannot be checked in this manner.

These difficulties are overcome in the present invention by employing a single digit in each of the multi-digit commands which control the operations to be performed by the computer for providing conditional stop control so that the programmer can insert conditional stop digits in the program at any point after the program has been written, without rearranging the command list. Also, the coder can insert a conditional stop digit into selected commands after the program has been inserted into the computer.

The signal information representing the conditional stop digits of the respective commands is sensed before the commands are executed by the computer, and the operation of the computer is halted after the command is executed if the conditional stop digit which is sensed has a predetermined magnitude.

I prefer to provide the sensing apparatus with a selector arranged so that the times at which the computer is halted are determined by both the setting of the selector and the numerical value of the conditional stop digit. In this manner, the frequency at which the computer is halted can be controlled by the operator after the program has been inserted into the computer and also after part of the program has been carried out by the operation of the computer.

In a preferred embodiment of the invention, the respective multi-digit commands which designate programs to be performed by the computer are stored on a storage medium in the computer, and the commands are fetched through a register before they are executed by the operation of the computer. The register is provided with a plurality of columns for registering the digits of the multi-digit commands, with each column having four toggles arranged to register a digit in the 1—2—4—8 system of counting. A gate is coupled through a selector switch to the column of the register in which the respective conditional stop digits are registered. The gate senses the condition of one toggle of the three toggles which represent the numbers 1, 2 and 4 in the 1—2—4—8 system of counting in accordance with the setting of the selector switch. Means are coupled to the gate for halting the operation of the computer if the toggle which is sensed is in an actuated condition.

In accordance with my invention, the condition of one selected toggle of the three toggles in the conditional stop digit column which represents the numbers 1, 2 and 4 may be sensed, so that if the number 7 is registered in the conditional stop digit column of the register, the operation of the computer is halted if any one of the three toggles is sensed. If the number 3 is registered in the conditional stop digit column, the operation of the computer is halted if either of the toggles representing the numbers 1 and 2 are sensed. If the number 1 is registered in the conditional stop digit column, the operation of the computer is halted if the toggle representing the number 1 is sensed.

This is because all three of the toggles representing the numbers 1, 2 and 4 are actuated when the conditional stop digit is number 7, because only the 1 and 2 toggles are actuated when the conditional stop digit is number 3, and because only the 1 toggle is actuated when the conditional stop digit is number 1.

The invention is explained with reference to the drawings, in which.

The invention is explained with reference to a digital computer of the so-called binary-coded decimal type. However, the invention may be employed in various other types of code-controlled apparatus in which command information is transfered through a storage register.

In a typical binary-coded decimal type computer, the individual digits of a number having a plurality of digits are each coded in a binary code notation ranging from 0 to 9. The binary notation is in the 1—2—4—8 system of counting, and a column of four bi-stable circuits may be employed to register each digit. The 1—2—4—8 system of counting may be illustrated as follows:

*Table I*

| Toggle | Binary Code 1 | 2 | 4 | 8 |
|---|---|---|---|---|
| Decimal Number: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |

where "1" indicates one condition of operation in a bi-stable toggle and "0" indicates another condition of operation.

If the four toggles which are employed to register each digit are designated by the numbers 1, 2, 4 and 8, the digit which is registered is equal to the sum of the numbers represented by the toggles which are actuated to the "1" condition.

By coupling a plurality of columns of four toggles together so that the registration in a particular set of toggles forming one column may be shifted into the toggles forming an adjacent column, a register may be formed in which the information may be registered by introducing signal information representing a binary-coded digit into an end column and thereafter shifting that registration along the columns of the register until a number having a given number of digits is represented in a like number of columns in the register.

Figure 1:
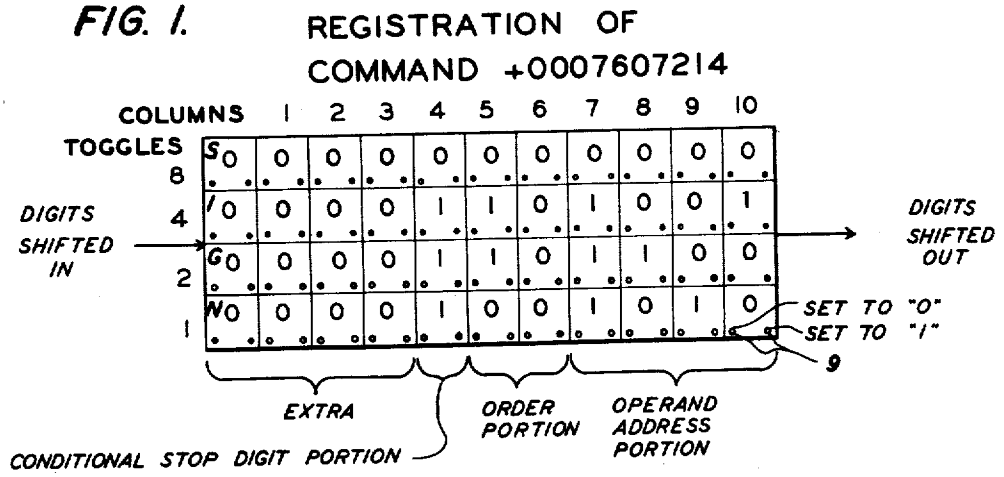
Fig. 1 shows a typical storage register for a computer and illustrates the registration of a command in the register.

Fig. 1 illustrates such a register having 11 columns of toggles with each column having four toggles representing the numbers 1—2—4—8. Preferably each toggle is provided with a pair of manually operable controls 9 which may be employed to set the toggles to the "0" or to the "1" state if desired. Ordinarily, these toggles are bi-stable multi-vibrators, with the corresponding toggles being coupled from left to right so that signal information representing digits may be shifted into the register from the left and shifted out of the register at the right-hand side. The "0" and "1" states of the toggles illustrated in Fig. 1 show how the command + 0007607214 would be registered in the toggles.

Registers of the general type illustrated in Fig. 1 are well known in the art and hence are not disclosed in detail here.

A typical command comprises an order portion and an operand address portion, as illustrated in Fig. 1. The order portion of the command indicates the arithmetic operation which is to be performed, and the operand address portion of the command indicates the address in the internal memory of the numerical information upon which the arithmetic operation is to be performed.

In the arrangement illustrated in Fig. 1, the operand address portion of the command is the last four digits of the command and these digits are registered in columns 7 through 10 of the register. The order portion of the command is the two digits which are registered in columns 5 and 6 of the register. Ordinarily, the remaining digits of the command are either unused or are used to cause the computer to perform special functions.

The operation of the computer may be halted by placing stop orders in the order portions of selected commands, but an entirely separate command is required for each stop order in this case. Such an arrangement has the disadvantage that the operator who arranges the program to be carried out by the computer must determine the points in the command program at which he believes such stops will be necessary before the program is prepared and before the program is stored in the computer.

This difficulty is overcome in the present invention by employing a single digit in each of the multi-digit commands for providing conditional stop control. If a zero is employed in the conditional stop location, the operation of the computer is not halted. However, if the digits 1, 3 or 7 are employed in the conditional stop digit location, the operation of the computer may be halted in accordance with the setting of a selector switch.

By employing a single digit in each of the multi-digit commands for providing conditional stop control, the programmer can insert conditional stop digits in the program at any point after the program has been written, without rearranging the command list. Also, the coder can insert a conditional stop digit into selected commands after the program has been inserted into the computer.

By employing a plurality of conditional stop digits, the frequency at which the computer is halted is controlled in accordance with the setting of the selector switch and the numerical value of the conditional stop digit.

As illustrated in Fig. 1, the conditional stop digit is located in the respective commands so that it immediately precedes the order portion of the command, and it is registered in column 4 of the register.

Figure 2:
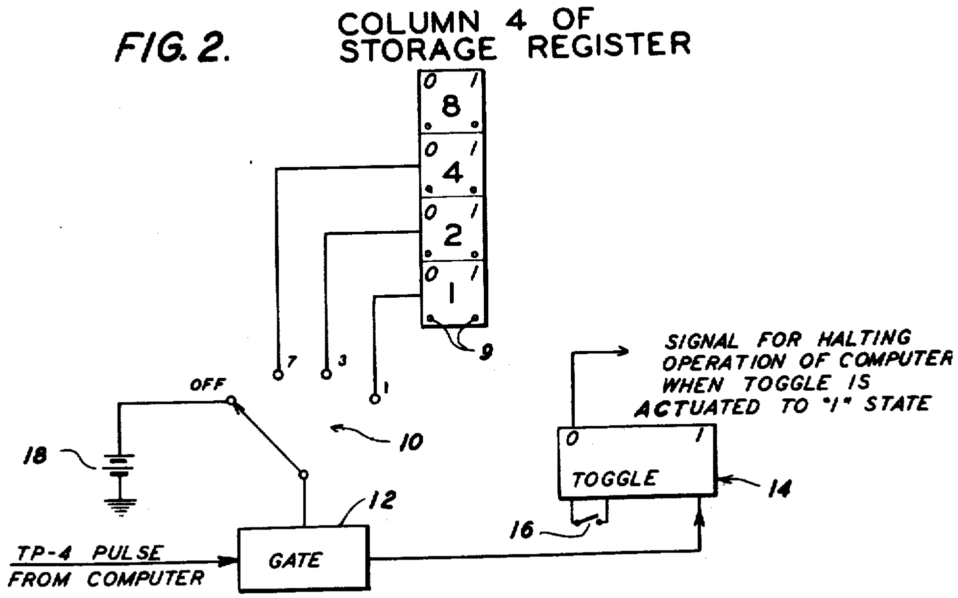
Fig. 2 shows how the conditional stop apparatus of my invention may be coupled to one column of the register of Fig. 1.

Fig. 2 illustrates a three-level sensing arrangement which is coupled to the conditional stop digit column of the register of Fig. 1. The sensing arrangement comprises a gate 12 which is coupled to the register through a switch 10 having four rotor positions which are designated 1, 3, 7 and Off. The rotor of the switch is connected to the gate 12, and it serves to actuate or open the gate when the rotor is at low potential. The gate 12 receives pulses from the computer, and when the gate is open the pulses are conveyed through the gate to a toggle 14 which halts the operation of the computer when the toggle is actuated to its "1" condition. This toggle is provided with a manually operated switch 16 for restoring it to its "0" state after it has been actuated to its "1" state by a pulse conveyed through the gate 12.

The contacts 1, 3 and 7 of the selector switch 10 are connected to the toggles 1, 2 and 4, respectively, so that these contacts are caused to be at low potential when the respective toggles are actuated to the "1" state and at high potential when the respective toggles are in the "0" state. A source of potential 18 is connected to the Off terminal of the switch so that it provides a high potential to the gate 12 when the rotor of the switch is at the Off position.

The conditions of the toggles shown in Fig. 2 when the conditional stop digits 1, 3 and 7 are registered is shown in tabular form as follows:

*Table II*

| Toggle | Binary Code 1 | 2 | 4 |
|---|---|---|---|
| Conditional Stop Number: | | | |
| 1 | 1 | 0 | 0 |
| 3 | 1 | 1 | 0 |
| 7 | 1 | 1 | 1 |

When the conditional stop digit is number 7, the gate 12 is open when the rotor of the switch 10 is at the 1, 3 or 7 position because all three of the toggles representing the numbers 1, 2 and 4 are actuated to the "1" state for this condition. When the conditional stop digit is number 3, the gate 12 is open when the rotor of the selector switch is in the 1 or 3 position because the toggles representing the numbers 1 and 2 are actuated to the "1" state for this condition. When the conditional stop digit is number 1, the gate 12 is open only when the rotor of the switch 10 is in the 1 position because only the toggle representing the number 1 is actuated to its "1" state for this condition.

Thus, the frequency at which the computer may be halted by conditional stop digits is determined both by the setting of the selector switch and by the numerical value of the conditional stop digit. Such an arrangement permits the operator to vary the frequency at which the computer is halted merely by adjusting the selector switch 10. Also, the selector switch 10 may be arranged to halt the operation of the computer at infrequent intervals of time, and if an error is detected, the preceding portion of the program may be re-run with the selector switch 10 arranged to halt the operation of the computer at more frequent intervals of time so that smaller portions of the program may be checked.

The number of levels in the sensing arrangement may be arranged as desired. If only a single level is required, it is necessary to sense only the toggle representing the number 1. If two levels are required, only two of the toggles must be sensed, and so on.

By way of example, after the programmer has prepared the command list for the computer, he may go through the list inserting into commands the digit 7 as the conditional stop digit at important check points in the command list. The digit 3 may be inserted into commands at selected intervals between those commands bearing the conditional stop digit 7, and the conditional stop digit 1 may be inserted into all other commands.

A common list of this type is shown below wherein X indicates a computer stop.

| | Setting of Switch 10 | | |
|---|---|---|---|
| Stop Digit | 1 | 3 | 7 |
| 0 | | | |
| 0 | | | |
| 7 | X | X | X |
| 1 | X | | |
| 0 | | | |
| 3 | X | X | |
| 0 | | | |
| 0 | | | |
| 1 | X | | |
| 0 | | | |
| 3 | X | X | |
| 0 | | | |
| 1 | X | | |
| 7 | X | X | X |

It will be seen upon examining the above list that the computer stops twice if the switch 10 is set to 7; the computer stops four times if the switch 10 is set to 3; and the computer stops seven times if the switch 10 is set to 1.

In operation of the computer, the operator may set the selector switch on 7, whereupon the computer will stop at relatively infrequent intervals and only when a 7 appears as the conditional stop digit. That is, the computer will stop only when the number 4 toggle of column 4 of the storage register of Fig. 2 is in its "1" state. Registration of the digits 1 or 3 in the column will not cause the computer to stop while the selector switch is set on 7 because, as can be seen in Fig. 2, the number 4 toggle of column 4 of the storage register is not in its "1" state when the digits 1 or 3 are registered in the column according to the 1—2—4—8 code. Since the computer makes infrequent stops, if no error is found, little time is lost in completing a program.

If, on the other hand, an error is discovered, then the preceding program portion can be re-run with the selector switch set at 3. The computer will then be stopped by both the number 7 and 3 conditional stop digits, because for either of these digits to be present, the number 3 toggle in Fig. 2 must be in its "1" state. However, no stop is caused by any of the number 1 conditional stop digits because their registration does not involve the actuation of toggle number 3 of the column.

Having isolated the error between two number 3 conditional stop digits, this small portion of the program can be re-run with the selector switch set on number 1, whereupon any of the conditional stop digits 1, 3 or 7 will stop the computer because the registration of any of them requires that the toggle number 1 of the column be in its "1" condition. Thus, the exact location of the error may be determined and corrected with considerable promptness.

Figure 3:
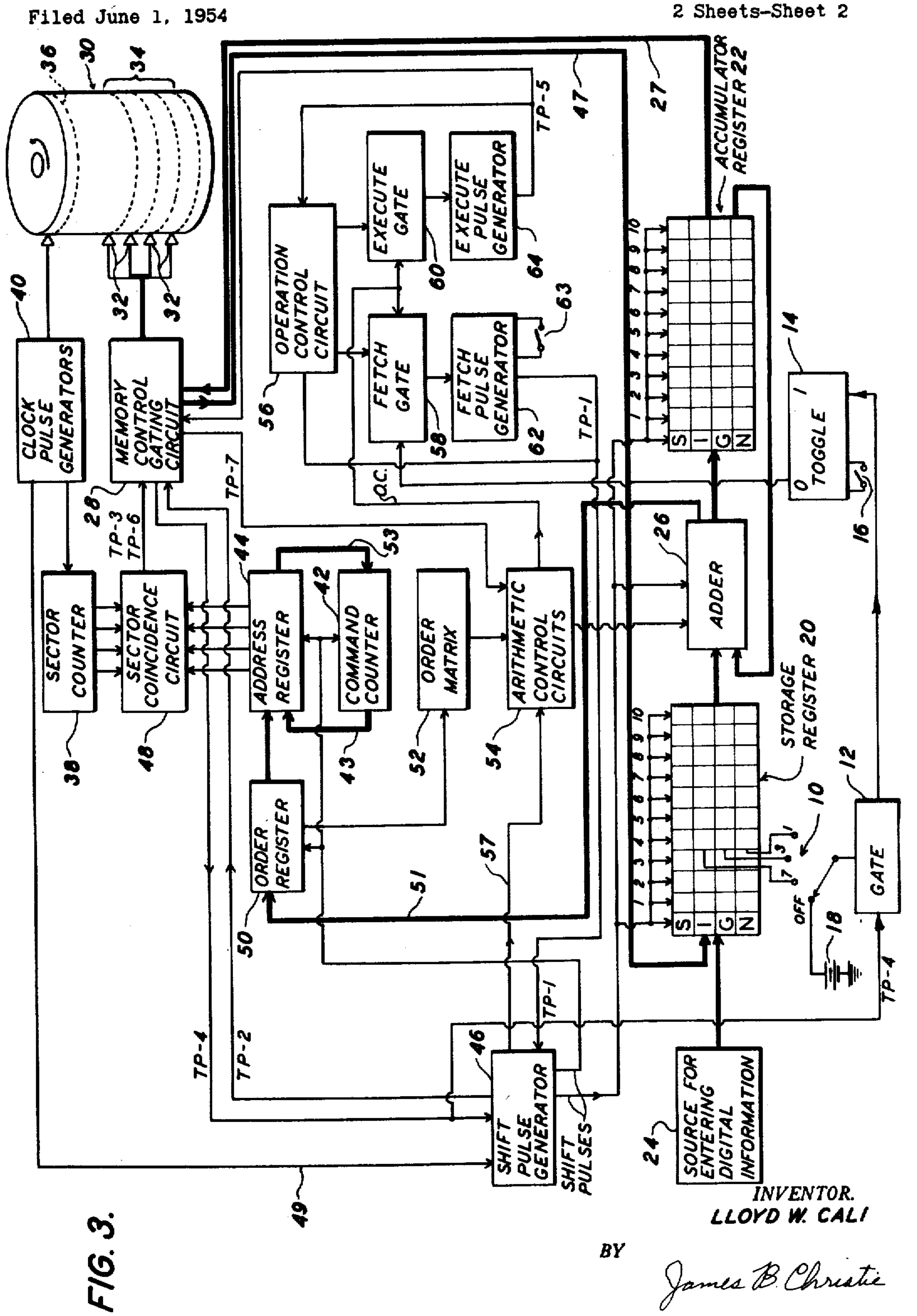
Fig. 3 shows the conditional stop apparatus of my invention employed in one type digital computer.

Fig. 3 shows how the conditional stop sensing arrangement of Fig. 2 may be employed in one type of computer.

The storage register 20 and the accumulator register 22 may be registers of the type shown in Fig. 1. The heavy lines on the drawing indicate signal information transfer links which are capable of passing the binary code signal information with respect to each digit of a series of digits in time parallel along one or more of the links. That is, each of these information transfer links is capable of conveying all of the binary code information with respect to a single digit at one time.

Digital information refers to signal information coded to represent digital values. Such digital information is first stored in the memory portion of the computer, then it is fetched from the memory through the storage register 20 during the operation of the computer. The conditional stop apparatus is arranged to sense the conditional stop digits of the respective commands while the commands are in the storage register 20 and before they are executed.

Digital information is introduced into the computer from a suitable source 24 which is coupled to the sign column of the storage register 20. The digits are entered one by one until the storage register is filled, and then they are transferred to the accumulator register 22 through an adder 26. The adder 26 receives digits one by one from the tenth column of both the storage register 20 and the accumulator register 22, and it transfers the sum of these digits into the sign column of the accumulator register from which they are shifted from left to right until the accumulator register is filled. In transferring information from the storage register to the accumulator register, zeros are added to the information which is transferred from the storage register to the adder so that the digits which are transferred from the adder to the accumulator register are the same as those which were present in the storage register.

The digital information in the accumulator register 22 is transferred through the link 27 and a memory control gating circuit 28 to a magnetic drum 30. The digital information is recorded magnetically on the drum by a plurality of transducers 32 so that it is located in a plurality of tracks 34 around the magnetic drum. In order to simplify this disclosure only four transducers are illustrated. These transducers are sufficient for recording a single series of digits in binary code form in time parallel in the band of tracks 34 so as to record a series of digits in accordance with the code of Table I.

The information is recorded on the magnetic drum at specific addresses with the number which is recorded in each of the addresses having ten binary-coded decimal digits plus an indication of the sign of the number. The addresses at which each group of ten digits may be recorded are identified by signals on a clock track 36 on the drum.

The individual addresses on the magnetic drum are identified by a sector counter 38, which, in response to pulses derived from the clock track via a clock pulse generator 40, keeps step with the instantaneous position of the magnetic drum 30, thereby indicating the particular address lying under the transducers 32.

The address of the first command to be executed is pre-set in a command counter 42, and is transferred through the link 43 to an address register 44 under the influence of shift pulses from a shift pulse generator 46. As soon as the address which is registered in the sector counter 38 is indentical to the address registered in the address register 44, a sector coincidence circuit 48 emits a signal indicating that the desired address is under the transducers 32. This output signal enables the memory control gating circuit 28 to pass the command which is recorded at that address on the magnetic drum through the link 47 to the storage register 20.

The operation of the shift pulse generator 46 is synchronized with the movement of the magnetic drum by the clock pulses which are received over a lead 49.

Under the influence of pulses from the shift pulse generator 46, the command which is registered in the storage register 20 is shifted through the adder 26 and the link 51 into the address register 44 and an order register 50. Ordinarily, zeros are added to the command as it is shifted through the adder so that the command which is transferred to the address register 44 and the order register 50 is the same as the command that was in the storage register 20.

The four digits which comprise the operand address portion of the command are registered in the address register, and the two digits which represent the order portion of the command are registered in the order register. The other four digits and the sign of the command are not employed in this operation.

Each time a new address is shifted into the address register 44, the old address is transferred over the link 53 to the command counter 42. The command counter is arranged to count up one for each address that is shifted into it. Hence the command counter may be employed to shift a sequence of commands into the address register with the sequence progressing in numerical order. In the alternative, the command counter may be set manually.

When the operand address which is registered in the address register and the address which is registered in the sector counter are the same, the sector coincidence circuit 48 and the memory control gating circuit 28 cause the operand to be transferred over the link 47 to the storage register 20.

The particular type of computation to be made with respect to the operand is determined by the numerical registration in the order register 50. An order matrix 52 is coupled to the order register, and it serves to provide an output which distinguishes the respective orders.

Arithmetic control circuits 54 are coupled between the order matrix 52 and the adder 26. They cause the adder to perform the arithmetic computation which is designated by the order matrix. The adder causes digits to be added to or subtracted from the operand which is in the storage register, and the result of the computation is transferred to the accumulator register 22. The information in the accumulator register may be employed in subsequent computations or it may be read out by means of a suitable print-out arrangement.

A detailed explanation of a suitable adder, along with the storage register, the accumulator register, and arithmetic control circuitry may be found in co-pending United States patent application, Serial No. 382,401, filed on September 25, 1953, entitled "Electronic Adder," and Serial No. 398,834, filed on December 17, 1953, now Patent No. 2,798,156 and entitled "Digit Pulse Counter."

After the operand has been transferred to the storage register and the arithmetic computations have been effected, the address of the next succeeding operand or command is shifted from the command counter into the address register. Then the above-described cycle of operations may be repeated under the control of the information which is registered in the order register and in the address register.

The storage register 20 is employed as a temporary storage medium for both the commands and the operands upon which the commands are executed. Hence the fourth column of the storage register is sensed for conditional stop digits during the fetch cycle of operation while the command is in the storage register, and it is not sensed for conditional stop digits during the execute cycle of operation while the operand is in the storage register.

The fetch and execute cycles of operation of the computer include a number of separate and distinct operations. In the computer illustrated, these operations are performed in accordance with seven timing pulses as follows:

TP–1 Shift command address from command counter to address register.

TP–2 Set memory control gating circuits to read the command at the address indicated in the address register.

TP–3 Transfer the command from the magnetic memory drum to the storage register.

TP–4 Transfer the command from the storage register to the order and address registers.

TP–5 Set memory control gating circuits to read the operand which is at the address registered in the address register.

TP–6 Transfer this operand from the magnetic memory drum to the storage register.

TP–7 Perform the arithmetic computation in accordance with the order in the order register.

The TP–1 to TP–4 pulses comprise the fetch cycle of operation, and the TP–5 to TP–7 pulses comprise the execute cycle of operation. The conditional stop apparatus is arranged to function in response to the TP–4 pulse at the end of the fetch cycle of operation.

In the computer illustrated, the cycles of operation are controlled by an operation control circuit 56 which is a bi-stable circuit arranged to open and close a fetch gate 58 and an execute gate 60 alternately in accordance with the condition of the bi-stable control circuit 56. These two gates are coupled to a fetch pulse generator 62 and an execute pulse generator 64 which serve to provide the TP–1 and TP–5 pulses. The fetch pulse generator 62 is provided with a switch 63 for actuating the generator to cause it to produce a TP–1 pulse.

A detailed discussion of a suitable operation control circuit 56 and the associated gates and pulse generators is not given because suitable conventional circuits for these purposes are well known in the art. Also, particularly suitable circuits for these purposes may be found in copending United States patent application, Serial No. 433,776, filed on June 1, 1954, now abandoned, and entitled "Control Circuitry for Digital Computing Machinery," by Ernst S. Selmer.

With respect to the series of timing pulses which are employed to control the operation of the computer, the fetching operation is initiated by the fetch pulse generator 62 providing a fetch pulse TP–1. When the operation of the computer is first initiated, the initial pulse TP–1 may be generated by actuating the switch 63 of the fetch pulse generator 62. This fetch pulse is applied to the shift pulse generator 46 and to the operation control circuit 56. The pulse which is applied to the operation control circuit 56 changes its bi-stable condition so as to open the execute gate 60 and close the fetch gate 58.

The fetch pulse TP–1 causes the shift pulse generator 46 to shift an address from the command counter 42 into the address register 44. At the conclusion of this operation, a TP–2 pulse is generated by the shift pulse generator 46 and applied to the memory control gating circuit 28 to enable a command to be derived from the magnetic drum 30 when a sector coincidence pulse TP–3 is provided by the sector coincidence circuit 48. The sector coincidence pulse TP–3 causes the command to be read from the drum to the storage register 20.

At the completion of this operation a TP–4 pulse is generated by the memory control gating circuit 28, and this pulse causes the shift pulse generator 46 to shift the command from the storage register 20 to the order register 50 and the address register 44.

This completes the fetching operation, and at this time an operation complete pulse OC is provided by the arithmetic control circuits 54 in response to a signal over the lead 57 from the shift pulse generator 46. The operation complete pulse OC is applied to the fetch gate 58 and to the execute gate 60. Since the fetch gate is closed and the execute gate is open due to the potentials provided by the operation control circuit 56, the operation complete pulse OC is conveyed through the gate to cause the execute pulse generator 64 to generate an execute pulse TP–5. This pulse is applied to the memory control gating circuit 28 and also to the operation control circuit 56 so as to close the execute gate 60 and to open the fetch gate 58.

The execute pulse TP–5 causes the memory control gating circuit 28 to read an operand, since the address register 44 now contains the address of an operand which is to be transferred to the storage register 20. The sector coincidence circuit 48 emits a coincidence pulse TP–6 which actuates the memory control gating circuit 28 to read the desired operand from the magnetic drum over the link 47 into the storage register 20. As before, the binary-coded decimal digits of the operand, appearing digit after digit, are shifted into the storage register by shift pulses which are derived from the shift pulse generator 46.

At the completion of this operation, a TP–7 pulse from the memory control gating circuit 28 is applied to the arithmetic control circuits 54 for initiating the arithmetic computation which is designated by the order which is registered in the order register 50.

At the completion of the arithmetic computation an operation complete pulse OC is emitted by the arithmetic control circuits 54 to indicate the completion of the execution operation. This pulse is applied to the fetch gate 58 and the execute gate 60. Since the execute gate is closed and the fetch gate is open, the pulse is conveyed through the fetch gate to cause the fetch pulse generator 62 to generate the next fetch pulse TP–1 so as to initiate another fetching operation.

The cycle then repeats itself with the fetching of a command, the registration of that command in the order register 50 and the address register 44, and the execution of the command.

As discussed above, the TP–4 pulses serve to cause information to be transferred from the storage register 20 into the order and address registers 50 and 44 at the end of the fetch cycle of operation. This TP–4 pulse is also applied to the gate 12 of the conditional stop apparatus, and it is conveyed through this gate to actuate the toggle 14 to its "1" state when the gate 12 is open. As discussed above with reference to Fig. 2, the gate 12 is open only when the potential which is applied to it from the switch 10 is low. The potential at the rotor of the switch 10 is determined by the setting of the switch and by the conditional stop digit which is registered in the fourth column of the storage register 20. If the conditional stop digit and the setting of the switch 10 are such that a low potential is applied to the gate 12, the TP–4 pulses are conveyed through the gate to the toggle 14 which in turn provides a signal which disables the fetch gate 58. If the rotor of the switch is at the Off position or if the digit in the conditional stop location and the setting of the switch are such that a high potential is applied to the gate 12 the gate remains closed and the toggle 14 remains in its "0" state.

The execute cycle of operation which comprises the pulses TP–5 to TP–7 is not affected by the disablement of the fetch gate 58. Hence the operand is read from the magnetic drum memory into the storage register 20 and the arithmetic computations are effected on the operand. However, the next fetch cycle requires that the fetch gate convey the operation complete pulse OC to the fetch pulse generator 62 so as to produce the next TP–1 pulse. This cannot take place if the fetch gate is disabled by the toggle 14 being in its "1" state. Thus, the operation of the computer is halted if the toggle 14 is in its "1" state, and it can be restored only by operation of the switch 16 to restore the toggle 14 to its "0" state. The times at which the computer is halted are determined by the conditional stop digits which are sensed in the storage register and by the setting of the switch 10.

Ordinarily a suitable number of conditional stop digits of different values may be incorporated in the commands before they are inserted in the machine. However, the conditional stop digits may be inserted into selected commands after the program has been inserted in the machine if desired. This may be effected by inserting the conditional stop digit into the command at any desired location in the computer before the command is employed to effect computations. By way of example, the command may be transferred from the magnetic drum through the storage register 20 and the adder 26 into the accumulator register 22 by first clearing the accumulator register so that zeros are registered in it and then adding the command to the zero registrations. While the command is in the accumulator register 22 the conditional stop digit may be inserted into the register by manually operating the controls 9 of the respective toggles in the fourth column of the register. Then the altered command is transferred through the link 27 and the memory control gating circuit 28 to its address on the magnetic drum 30.

It will be apparent that the conditional stop apparatus of Fig. 2 may be employed in other types of code-controlled apparatus in which multi-digit commands which designate operations to be performed by the apparatus are fetched through a register, and the conditional stop apparatus is not limited to use with computers of the specific type illustrated in Fig. 3.

I claim:

1. A digital computer comprising means for storing signal information arranged in the form of multi-digit commands which designate programs to be performed by the computer, with each multi-digit command having a conditional stop digit at a predetermined location in the command for use in halting the operation of the computer, means for inserting signal information in the conditional stop digit locations of the respective commands after the commands have been stored in the computer, means for sensing the signal information representing the conditional stop digit of the respective commands before the commands are executed by the operations of the computer, and means coupled to the sensing means for halting the operation of the computer at the completion of the execution of the command if the signal information which is sensed represents a digit which has a predetermined magnitude.

2. A digital computer comprising means for storing signal information arranged in the form of multi-digit commands which designate programs to be performed by the computer, with each multi-digit command having a conditional stop digit at a predetermined location in the command for use in halting the operation of the computer, means for inserting signal information in the conditional stop digit locations of the respective commands after the commands have been stored in the computer, means for sensing the signal information representing the conditional stop digit of the respective commands before the commands are executed by the operations of the computer, and means coupled to the sensing means for selectively halting the operation of the computer if the signal information which is sensed represents a digit which is one of a plurality of predetermined numbers.

3. Means for selectively halting the operation of code-controlled apparatus comprising a register for receiving signal information coded in the form of multi-digit commands which designate operations to be performed by said apparatus and which signal information includes conditional stop digits for use in halting the operation of the computer, sensing means coupled to the register for sensing the signal information representing the value of the conditional stop digit in the respective multi-digit commands, the sensing means being adapted to be actuated when the conditional stop digit represents any one of a plurality of values for the digit, means coupled to the sensing means for selecting the particular values of the plurality of values whose signal representation will suffice to actuate the sensing means, and means coupled to the sensing means and responsive to actuation of the sensing means for halting the operation of the apparatus.

4. In code-controlled apparatus having a medium for storing signal information arranged in the form of multi-digit commands which designate programs to be performed by the apparatus and which signal information includes conditional stop digits for use in halting the operation of the computer, and also having means including a register coupled to the storage medium, the improvement which comprises means coupled to said register for sensing the signal information representing the value of the conditional stop digit at a predetermined location in the respective multi-digit commands, the sensing means being adapted to be actuated when the signal information represents any of a plurality of values for the conditional stop digit, means coupled to the sensing means for selecting the particular values of the plurality of values whose signal representation will suffice to actuate the sensing means, and means coupled to the sensing means and responsive to actuation of the sensing means for halting the operation of the apparatus.

5. In a digital computer having a medium for storing signal information arranged in the form of coded multi-digit commands which designate programs to be performed by the computer and which signal information includes conditional stop digits for use in halting the operation of the computer, means for fetching the multi-digit commands from the storage medium, and means for executing the commands after they have been fetched, so that each command is carried out by a fetch and execute sequence of operation, the improvement which comprises means coupled to the fetching means for sensing the signal information representing the value of the conditional stop digit of the respective multi-digit commands during the fetch operation, the sensing means being adapted to actuate when the signal information represents any of a plurality of values for the conditional stop digit, means coupled to the sensing means for selecting the particular values of the plurality of values whose signal representation will suffice to actuate the sensing means, and means coupled to the sensing means and responsive to actuation of the sensing means for halting the operation of the computer before the next fetch operation.

6. In a digital computer having a medium for storing signal information arranged in the form of multi-digit commands which designate programs to be performed by the apparatus, and also having means including a register coupled to the storage medium for fetching the multi-digit commands from the storage medium, with each multi-digit command having a conditional stop digit at a predetermined location in the command for use in halting the operation of the computer, the improvement which comprises means coupled to said register for sensing the signal information representing the conditional stop digit of the respective multi-digit commands, the sensing means being adapted to be actuated when the signal information represents any of a plurality of values for the conditional stop digit, means coupled to the sensing means and responsive to actuation of the sensing means for halting the operation of the computer, and means coupled to the sensing means for selecting the particular value of the conditional stop digit whose signal information will suffice to actuate the sensing means, thereby causing the frequency at which the computer will be stopped to depend upon the number of multi-digit commands bearing a conditional stop digit of the selected value.

7. In a code-controlled apparatus having a medium for storing signal information arranged in the form of multi-digit commands which designate programs to be performed by the apparatus, and also having means including a register coupled to the storage medium for fetching the multi-digit commands from the storage medium, the register having a plurality of columns for registering digits with each column having four toggles arranged to register a digit in a binary system of counting, the improvement which comprises means coupled to one column of said register for sensing the signal information representing a particular digit of the respective multi-digit commands, the sensing means being adapted to be actuated by signal information appearing as any of a plurality of digital values registered by the toggles of said column, adjustable means coupled to the sensing means for selecting the particular digital values whose registration in said column will suffice to actuate the sensing means, and means coupled to the sensing means and responsive to actuation of the sensing means for halting the operation of the apparatus.

References Cited in the file of this patent

UNITED STATES PATENTS

| | | |
|---|---|---|
| 2,604,262 | Phelps | July 22, 1952 |
| 2,777,634 | Williams | Jan. 15, 1957 |
| 2,789,759 | Tootill | Apr. 23, 1957 |

OTHER REFERENCES

Proc. of the Inst. of Electrical Engr., February 1951, "Universal High Speed Digital Computers"; A Small Scale Experimental Machine by Williams et al., pages 13–34. Note section (7.5).

"Functional Description of the EDVAC," Moore School of Engineering, Univ. of Pennsylvania, received U.S. Patent Office, May 3, 1951. Vol. I, pp. 2–1 to 2–5, 2–11 to 2–21, 1–1 to 1–5. Vol. II, Figs. 104–2LD–5, 104–2LD–7, 104–2LD–8, 104–10LD–6.

Description of a Magnetic Drum Calculator, Annals of the Computation Laboratory, Harvard Univ., vol. XXV, Harvard Press, August 22, 1952, pages 206 and 211.

UNITED STATES PATENT OFFICE

CERTIFICATE OF CORRECTION

Patent No. 2,907,524 October 6, 1959

Lloyd W. Cali

It is hereby certified that error appears in the printed specification of the above numbered patent requiring correction and that the said Letters Patent should read as corrected below.

Column 5, line 25, for "common" read -- command --.

Signed and sealed this 22nd day of March 1960.

(SEAL)

Attest:

KARL H. AXLINE
Attesting Officer

ROBERT C. WATSON
Commissioner of Patents